United States Patent [19]

Faulkner

[11] 4,056,780

[45] Nov. 1, 1977

[54] VEHICLE REPEATER PRIORITIZATION SYSTEM

[75] Inventor: Thomas Edward Faulkner, Margate, Fla.

[73] Assignee: Motorola, Inc., Schaumburg, Ill.

[21] Appl. No.: 590,006

[22] Filed: June 25, 1975

[51] Int. Cl.² .......................... H04B 1/40; H04B 7/14
[52] U.S. Cl. ................................... 325/5; 325/6;
325/22; 325/57; 325/53
[58] Field of Search ........................... 325/1–8,
325/21, 22, 53, 55, 56, 57, 64; 179/41 A;
343/175–178, 180

[56] References Cited

U.S. PATENT DOCUMENTS

| 2,932,729 | 4/1960 | Yamato et al. | 325/57 |
|---|---|---|---|
| 2,987,615 | 6/1961 | Dimmer | 325/57 |
| 3,366,880 | 1/1968 | Driver | 325/22 |
| 3,532,987 | 10/1970 | Turriere | 325/55 |
| 3,571,512 | 3/1971 | Quiros | 325/22 |
| 3,745,462 | 7/1973 | Trimble | 325/4 |
| 3,955,140 | 5/1976 | Stephens et al. | 325/4 |

Primary Examiner—Robert L. Griffin
Assistant Examiner—Jin F. Ng

Attorney, Agent, or Firm—James P. Hamley; James W. Gillman

[57] ABSTRACT

An improved repeater adds on to each mobile transceiver of a radio wave communication system for selectively controlling rebroadcasts to an associated portable station. Novel circuitry within each associated repeater eliminates rebroadcast interference among local units, while keeping retransmission delay at an optimized minimum.

At turn on, detector circuitry senses if a nearby repeater is broadcasting. In response thereto, programmable delay circuitry is activated to a high incremental state. Where no repeater broadcast is sensed, a program signal is transmitted which increments all nearby repeaters to their next higher delay state. On reception of a signal to be rebroadcast, the repeater whose delay circuitry is in the lowest incremental state initiates rebroadcast, thereby inhibiting the remaining units.

A special feature of the programmable delay circuitry is that each repeater is automatically assigned a unique incremental delay time whereby repeater prioritization is positively established. Rebroadcast delay time is kept to a minimum as the system assures that one repeater is at the lowest delay priority.

33 Claims, 2 Drawing Figures

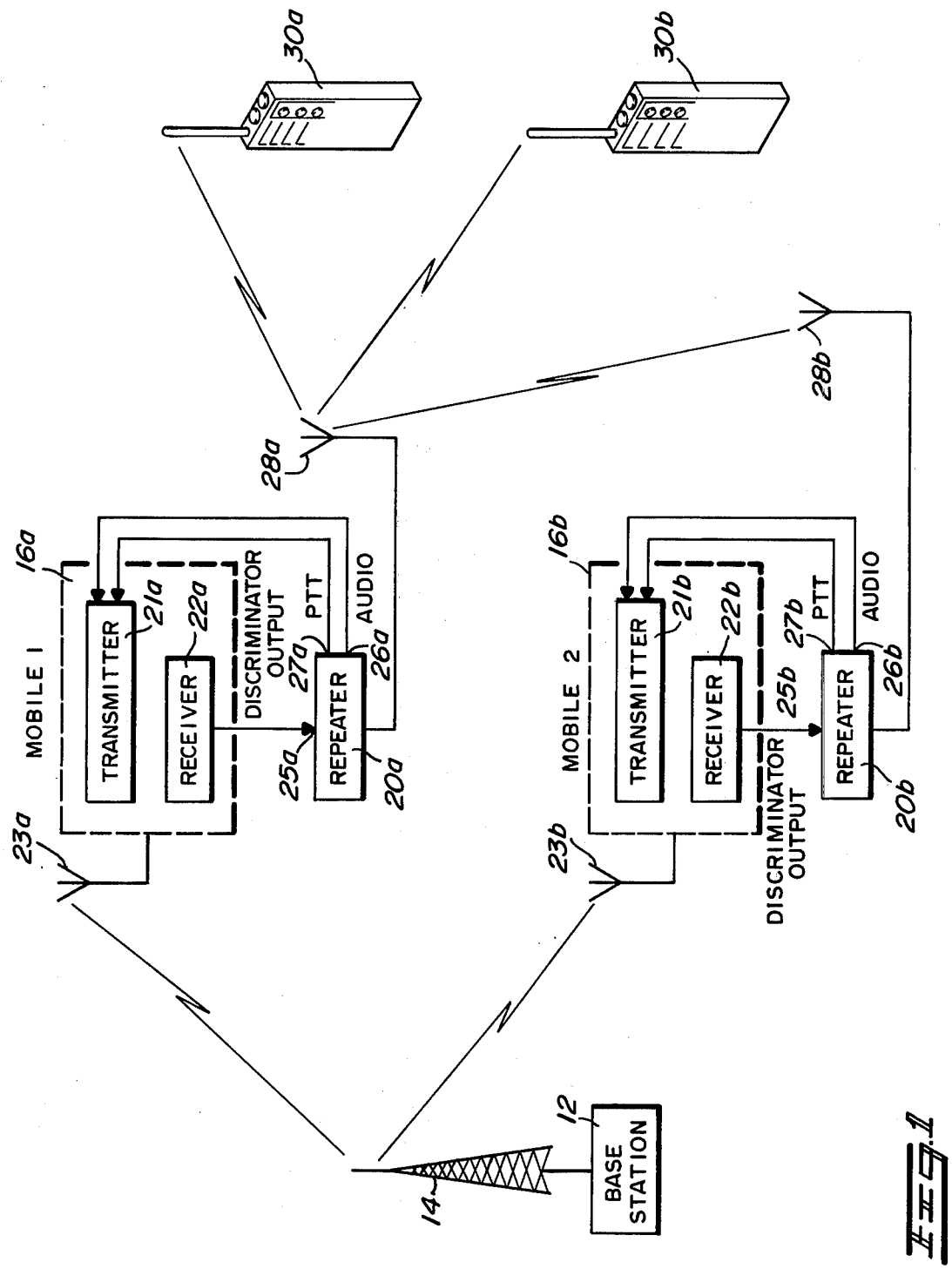

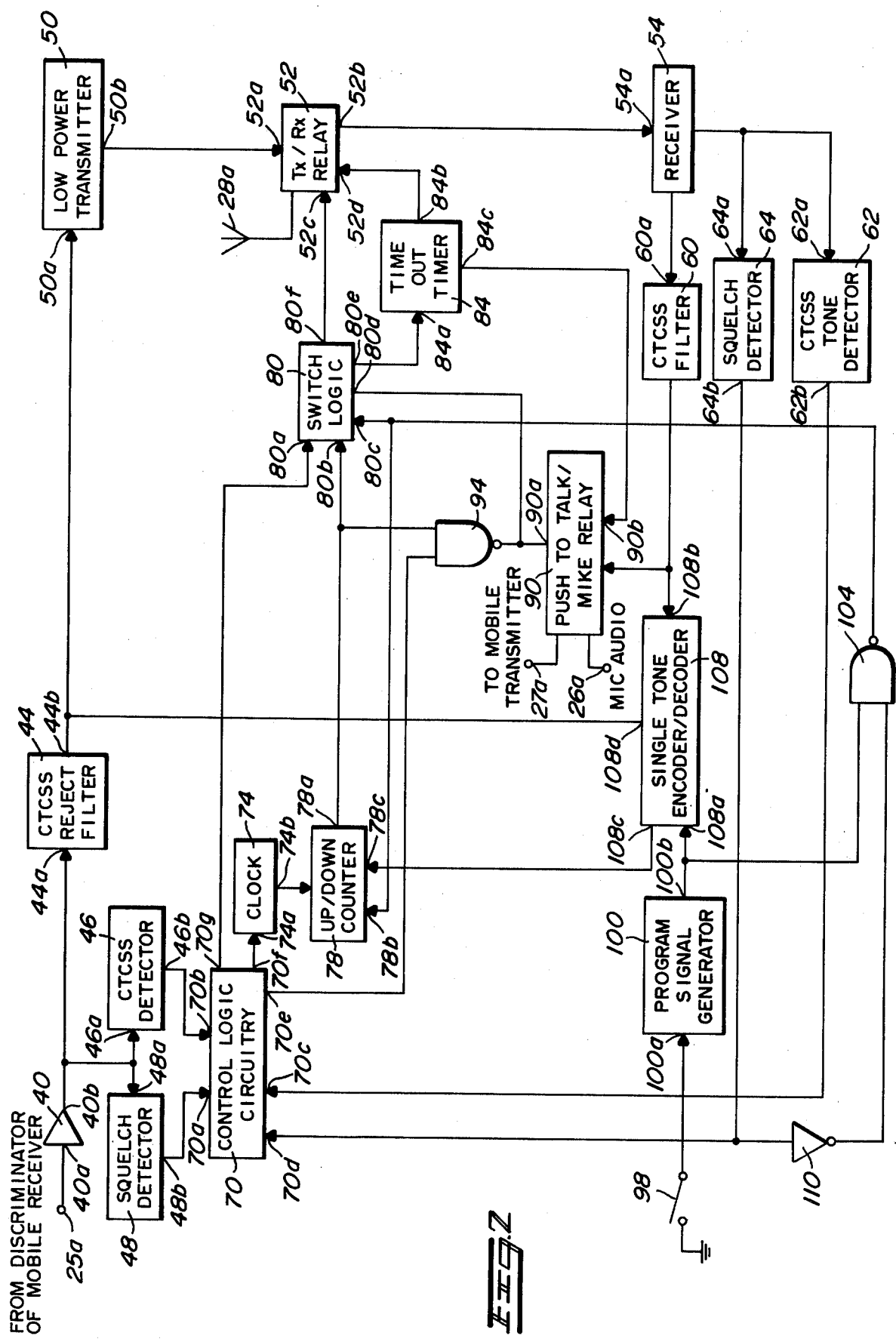

VEHICLE REPEATER PRIORITIZATION SYSTEM

BACKGROUND OF THE INVENTION

The present invention relates generally to radio wave communication systems of the type employing a base station, a plurality of portable stations and a plurality of mobile repeating stations, and more particularly to improved means for, and a method of, assigning a rebroadcast priority to the repeaters in such systems in a mamnner to minimize undesireable interference.

Mobile ratio wave communication systems normally comprise a base station and a plurality of mobile stations, each of which is typically located with an automotive vehicle. In many applications, such as police work, it is important for the user to maintain communication with the base station or other mobile transceivers upon leaving his mobile vehicle. To resolve this problem various repeater add-on systems have been proposed. Generally, such systems interconnect with the mobile transceiver whereby the audio signal from the transceiver is reprocessed through a second transmitter and broadcast on a second frequency to a portable transceiver. Likewise, signals from the portable transceiver are received in a second receiver and applied to the mobile transceiver where they are broadcast back out on the mobile-base station frequency.

A problem with such repeater systems occurs when a plurality of mobile transceivers are in the same locale. In this situation each repeater will attempt to rebroadcast base station, mobile, or portable transmissions. Simultaneous broadcasts by nearby repeaters results in interference creating loss of intelligibility of the transmitted signals. One solution to the interference problem is to operate the various repeaters and their respective portable transceivers on different frequencies. However, this anticipates a complicated and cumbersome system.

A second solution, known in the art, contemplates a random sampling technique. Accordingly, a random sampling generator is to be included in each repeater in the communications system. Once a signal to be retransmitted is received the first repeater whose random sampling generator creates an enable pulse following the received signal transmits a lockout to any other repeaters and proceeds to repeat the incoming information. This system has several undesirable drawbacks. First there is a considerable delay time introduced by the sampling function. This delay is in addition to the normal attack times of a transmiter or receiver. The increased delay time might be as long as the disable period of a random sampling generator. Further, there remains a significant probability of interference among transceiver units using the random sampling method. Finally, if the sampling generators are identical and enable pulses occur at similar times in two or more units there is the possibility that the pulses may tend to remain in synchronism and interference would occur on each transmission. The only means to break the interference would be waiting until the enable pulses drift out of synchronization or to shut off one of the offending repeaters.

OBJECTS OF THE INVENTION

It is an object of the present invention, therefore, to provide a repeating system which eliminates interference between nearby repeater units.

It is a further object of the present invention to provide a repeating system as described above which initiates rebroadcasts with a minimum delay time.

A further object of the present invention is to provide a repeating system as described above which is fully automatic in operation.

Briefly, according to the invention, a radio wave communication system comprises a base station and mobile stations broadcasting signals at a first frequency, a portable station receiving signals broadcast at a second frequency, and a plurality of repeaters receiving signals broadcast at a first frequency and rebroadcasting said signals at the second frequency. Each repeater comprises delay circuitry delaying rebroadcasts for a programmed time period; a detector sensing for signals broadcast at the second frequency during the delay period and including means inhibiting repeater rebroadcast in response to a received detect signal; and means for programming the time delay.

The programmed delay circuitry includes a clock, a counter, and comparator means instituting rebroadcast at a predetermined count. The counter outputs a high count in its first mode and an initial count in its second mode. Further, the counter is adapted to increment its count output in a first polarity responsive to received program signals, and in a second polarity in response to input clock pulses. On reception of a signal to be rebroadcast, the clock initiates and begins counting down the counter. The first repeater to be incremented to its lowest state is the first to satisfy the comparator whereby retransmission occurs locking out the remaining repeaters.

Repeater programming occurs when a portable unit is removed from the repeater mobile transceiver. At this time the repeater senses whether or not a transmission is occurring on the second frequency, acting to transmit a program signal incrementing all nearby repeaters to the next higher counter state in the absence of a second signal, and otherwise incrementing its own counter to a higher state if a detected signal is present. Thus, generally, the last repeater to enter an area will be the one in the lowest incremental state, hence the one to repeat all transmissions. Should the repeater in the lowest counter state leave the area, a remaining repeater in the second highest priority will rebroadcast after its time delay, and reset its own counter to the lowest state whereby minimum time delay is established for subsequent transmissions.

BRIEF DESCRIPTION OF THE DRAWINGS

FIG. 1 illustrates a generalized communication system comprising a base station, a pair of mobile stations, and a pair of portable stations; and FIG. 2 is a detailed block diagram of a repeater according to the invention.

DETAILED DESCRIPTION OF THE PREFERRED EMBODIMENT OF THE INVENTION

FIG. 1 illustrates a generalized communication system comprising a base station 12, mobile transceivers 16a, b, associated repeaters 20a, b, and portable transceivers 30a, b. Each mobile transceiver 16a, b, is comprised of a transmitter 21a, b, and a receiver 22a, b each of which operates on a first frequency. Inputs to the mobile transceivers 16a, b are coupled through corresponding antennas 22a, b respectively. The base station 12, which also operates on the first frequency, transmits and receives signals through its antenna 14.

Signals from the mobile receivers 22a, b are fed to the repeater mobile audio inputs 25a, b respectively. Audio at repeater outputs 27a, b feed into mobile transmitters 21a, b as do repeater push-to-talk outputs 27a, b respectively. Repeater 20a, b output signals at a secondary frequency are transmitted via repeater antennas 28a, b to the portable 30a, b which similarly operate on the second frequency.

In operation each mobile transceiver 16a, b might be located in an automotive vehicle. The repeaters 20a, b are "add on" networks to the existing transceiver 16a, b requiring a minimum of interconnections. When the user leaves his vehicle, he carries the portable transceiver 30a, b which corresponds to his repeater unit. Assuming a signal is received on antennas 23a, b at this first frequency, the receivers 22a, b process the RF input which is then fed to a corresponding repeater 20a, b respectively. This initiates a clock (shown in FIG. 2) internal to the repeater whose output begins counting down a programmed counter (FIG. 2) located within the repeater. The first repeater whose count reaches a predetermined state (repeater 20a in the figure) processes the signal from the mobile receiver 22a retransmitting it via antenna 28a at the second frequency to the portables 30a, b. Each repeater is programmed to a different incremental delay, whereby the repeater whose delay is in its lowest state will be the first to retransmit the received signal, this transmission blocking out remaining repeaters.

Repeater programming may be described as follows. When the portable transceiver 30a, b is removed from a corresponding repeater 20a, b a switch is activated whereby the repeater is energized. Once activated the repeater determines whether or not a transmission is occurring on the second frequency. If no second frequency transmission is detected, the repeater sets its own counter to the zero state and broadcasts a program signal on the second frequency to other repeaters. This program signal increments the remaining repeaters to their next highest delay state. Thus, a subsequent broadcast for retransmission will be handled by this latest arriving repeater. If, however, a transmission on the second frequency is sensed by the repeater turning on, it increments its own counter to a higher state and does not broadcast the program signal. Should the repeater in the lowest delay state leave the area or become inoperative, the repeater in the next lowest delay state will carry the rebroadcast and reset its counter to the lowest or zero state whereby in subsequent broadcasts a minimum delay is encountered. Transmissions from the portable transceivers 30a, b are picked up via repeater antennas 28a, b and processed through a repeater internal receiver (not shown) which demodulates the second frequency RF signal to audio. Once again the repeater's delay mechanism is activated whereby the repeater in the lowest delay state transmits the audio via its line output 26a or b and a push-to-talk command signal at output 27a or b to the transceiver transmitter 21a or b. The transmitter thereafter translates the audio signal to the first RF frequency, broadcasting it back to the base station.

FIG. 2 is a detailed block diagram of the first repeater 20a shown in FIG. 1. It should be understood that repeater 20a is representative of all repeaters in the commumication system according to the invention.

The output from the discriminator of the mobile receiver 22a (FIG. 1) is applied to repeater inputs 25a which connects to the input 40a of buffer amplifier 40. Buffer amplifier output 40b couples, first, to the input 44a of Continuous Tone Control Squelch System (CTCSS) reject filter 44, secondly to the input 46a of CTCSS detector 46 and, finally, to the input 48a of squelch detector 48.

In a continuous tone control squelch system a subaudible tone, usually between 67 to 200 Hz, is broadcast with the audio information. Each transceiver has frequency selective circuitry responsive to a particular tone in this range. In this way a single channel may be established between two stations simply by broadcasting the appropriate tone. Moreover, the tone level may be used as a squelch reference. Thus, CTCSS reject filter 44 removes the subaudible tone from the audio signal, whereas CTCSS detector 46 senses for the presence of the particular tone changing its output state at output 46b in response thereto. Squelch detector 48 senses for presence of the broadcast carrier, producing an active output state on output 48b in response thereto.

The output 44b of CTCSS reject filter 44 feeds to the input 50a of low power transmitter 50, whose output 50b is applied to one terminal 52a of the transmit/receive relay 52. The second contact 52b of the relay 52 connects to the input 54a of the receiver 54. Both the transmitter 50 and receiver 54 operate at a second frequency suitable for communication with the portable station. Transmit/receive relay 52 acts in response to control signals at its two control inputs 52c, d to route either the receiver 54 or the transmitter 50 to antenna 28a.

The discriminator output of receiver 54 feeds first to input 62a of CTCSS tone detector 62 and second to the input 64a of squelch detector 64. The receiver's audio output feeds to the input 60a of CTCSS filter 60. CTCSS filter 60 selectively suppresses the subaudible tone which identifies this particular transceiver. CTCSS tone detector 62 operates in an identical manner as detector 46, and squelch detector 64 operates identically to squelch detector 48.

Squelch detector output 48b connects to the first input 70a of control logic circuitry 70, CTCSS detector 46b connects to the logic circuitry second input 70b and the logic detector third input 70c connects to the CTCSS tone detector 62 output 62b. Finally the logic circuitry fourth input 70d connects to the squelch detector output 64b. A first logic circuitry output 70e feeds to one input of a two input NAND gate 94, a second logic circuitry output 70f connects to the input 74a of a clock 74, and the final logic circuitry output 70g connects to one input 80a of switch logic 80. In response to signals applied at its inputs 70a–d the logic circuitry 70 predeterminedly activates selected ones of its outputs 70e–g. An active output 70f triggers clock 74 which couples clock signals at clock output 74b to the first input 78a of up-down counter 78. Counter output 78a connects first to the second input 80b of switch logic 80, and second to the second input of NAND gate 94. The output of NAND gate 94 connects first to the first input 90a of push-to-talk/mike relay 90 and second to an output 80d of switch logic 80. The switch logic output 80e connects to the input 84a of a time out timer 84 whose first output 84b connects to the second control terminal 52d of relay 52, and whose second output 84c connects to a second input 90b of push-to-talk/mike relay 90. The remaining switch logic output 80f, connects to relay input 52c. The switch logic 80 activates predetermined output terminals 80d–f in response to control signals at its inputs 80a–c. A primary function of switch logic 80 is the control via switch output 80f of the transmit/receive relay 52.

A switch 98, which activates upon the portable unit being removed from its corresponding repeater, connects to the input 100a of a program signal generator 100. The program signal generator output 100b connects to one input of a two input NAND gate 104 and to the first input 108a of the signal tone encoder/decoder 108. The NAND gate 104 second input is fed from the squelch detector output 64b through an inverter 110. The NAND gate 104 output connects first to the second input 78b of up-down counter 78 and second to the third input 80c of switch logic 80. Single tone decoder 108 has a first output 108c which connects to the second input 78c of the up-down counter 78, and a second output 108c which connects to the input 50a of transmitter 50.

REPEATER OPERATION

Received signals from the mobile receiver (22a in FIG. 1), are passed to repeaer input 25a where they are buffered by amplifier 40 and then routed to CTCSS reject filter 44, CTCSS detector 46, and squelch detector 48. Filter 44 removes the subaudible code tone and passes the resulting signal to the low power transmitter 50. Transmitter 50 translates the incoming signal to a second frequency for communication for a portable unit. As the portable units will be in proximity to the repeater, transmitter 50 normally produces a power level comparable to that of a portable. If relay 52 is activated to the transmit mode, the transmitter signal is passed out over antenna 28a to the portable. Should the relay be activated to the receive mode, no transmission would occur.

Squelch detector 48 activates its output 48b should the input signal contain the desired carrier, and, similarly, CTCSS detector 46 activates its output 46b should the input signal contain the "private line" tone. Logic circuitry 70 monitors the output states of the two detectors 48, 46.

Also monitored by the logic circuitry are the outputs (64b, 62b) of squelch detector 64 and CTCSS tone detector 62. If a signal broadcast on the second frequency, e.g. from a portable unit, is received by receiver 54, squelch detector 64 will activate its output 64b should the signal contain a proper carrier, and, likewise, CTCSS tone detector 62 will activate its output 62b should the received signal contain the proper tone.

If control inputs 70a, and 70b are activated, meaning there is a received mobile carrier and code tone, and if logic circuitry inputs 70c, d are inactivated, meaning there is no received portable signal, then control logic outputs 70f, g are activated. With line 70f activated clock input 74a is triggered whereby clock 74 begins producing clock pulses which are applied to the input 78a of up-down counter 78. Counter 78 is programmed to an initial state (which programming is described below) whereby the clock pulses cause the counter to down count. Thus, if the counter is in its "4" state, subsequently received pulses would increment the counter to its 3, 2, 1, and then 0 state. Once the counter has reached its 0 state it produces an activated output on output 78a which couples to switch logic input 80b. Should both switch logic inputs 80a, and 80b be activated, logic outputs 80f becomes activated whereby the transmitter 50 couples to the antenna 28a for retransmission. Otherwise the antenna couples to the receiver 54 inhibiting retransmission.

Portable to base repeater rebroadcast occurs as follows. If logic circuitry inputs 70a, b are inactivated, implying no mobile signal, and inputs 70c, d are activated implying a received portable signal then outputs 70e, f are activated. As before, an activated output 70f triggers clock 74 whereby clock pulses couple to "down count" up-down counter 78. Once counter 78 increments to its 0 state counter output 78a is activated resulting in NAND gate 94 activating its output. Since logice circuit output 70g is not activated in this mode, the switch logic maintains the antenna 28 coupled to the receiver 54.

An activated NAND gate 94 triggers the push-to-talk/mike relay 90 via its input 90a whereby push-to-talk output 27a, which couples to the mobile transmitter (see FIG. 1) activates the transmitter to its transmit mode. Also, the signal received by receiver 54 couples from the output of CTCSS filter 60 through mike relay 90 to mike audio output 26a where it is coupled to the mobile transmitter input. The mobile transmitter thereby rebroadcasts the signal on the first frequency.

A time out timer 84 is a safety device which prevents the transmitter from locking onto the antenna during times when no retransmission is desired. Internal to the timer is circuitry which, after a given time period, produces inhibit pulses at outputs 84b, 84c assuring that relay 52 is switched to the receive mode, and that push-to-talk/mike relay 90 is deactivated.

The communication system operation depends on each repeater in the system being incremented to a different delay state whereby the repeater incremented to its lowest state handles all rebroacasting. System programming is understood as follows. Once a portable unit is removed from its corresponding repeater, switch 98 activates thus activating input 100a of program signal generator 100. This causes signal generator 100 to generate a burst program single which is applied to NAND gate 104 and signal tone encoder/decoder 108. If, at the time of signal generator turn on, receiver 54 is receiving a signal broadcast at the second frequency, i.e., a signal from a portable unit or from another repeater, squelch detector output 64b is activated and inverted by inverter 110 whereby NAND gate 104 is not satisfied. With NAND gate 104 output deactivated, input 78b of up-down counter is deactivated whereby the counter increments to a high delay state, and input 80c to switch logic 80 is deactivated whereby the switch logic maintains the relay 52 in the receive mode.

If, however, no signal is being received by receiver 54 on the second frequency, NAND gate 104 will activate its output whereby up-down counter 78 increments to its initial, or zero state, and switch logic input 80c activates logic output 80f, which in turn activates switch relay 52 to the transmit mode. In addition, the program signal feeds to single tone encoder/decoder input 108a where it is passed to output 108d and there to the input 50a of transmitter 50. Since transmitter 50 is coupled through relay 52 to the antenna 28a the program signal is broadcast out to other repeaters at the second frequency, incrementing them to a higher delay state.

If a subsequent repeater comes into the area it will generate a program signal which couples through antenna 28a, relay 52, receiver 54, and CTCSS filter 60 to input 108b of the single tone encoder/decoder 108. Enlcoder/decoder 108 activates outputs 108c in response to a received program signal. This activated output couples to input 78c of up-down counter 78 whereby the counter increments to its next higher state. That is, assuming counter 70 were in the zero state, it would now be activated to its one state. Similarly, all other repeaters in the area would be incremented to the next higher state. Since rebroadcast can only occur when an up-down counter 78 reaches its zero state, the counter at the lowest initial increment will always be the first to rebroadcast, and as is seen, this will normally be the last repeater unit to enter a given area.

When the first repeater begins rebroadcast, all remaining repeaters will be inhibited. This is understood as follows. Assuming a signal were to be rebroadcast from the mobile receiver, logic circuitry inputs 70a, b would be activated. If another repeater began rebroadcasting these signals on the second frequency logic circuitry input 70c, d would also become activated. In response to all of its inputs activated, logic circuitry 70 would deactivate output 70f whereby the clock 74 could no longer incrementally count down counter 78. Thus counter 78 would never reach its zero state and the repeater would be inhibited from retransmission. Broadcasts from the portable to mobile are similarly inhibited.

An additional feature of the repeater system is that once a repeater which was formerly in the zero state leaves the area, or is disabled, all remaining repeaters will increment down to the next lower state. The repeater whose counter is in the zero state will constantly activate input 80b of switch logic 80 whereby retransmission occurs the instant logic circuitry output 70g becomes activated. This retransmission inhibits all remaining repeaters before the clock 74 can begin the "count down". However, with the zero state counter deactivated, the clock would activate long enough for the counter in the one state to count down to zero whereat it would rebroadcast and inhibit the remaining repeaters. Similarly, all other repeaters in the area would be incremented by one clock pulse to the next lower counter increment. Thereafter the counter that was formerly incremented to the one state would now be in the zero state, with the remaining repeaters in sequential order thereabove.

In summary, a repeating system which adds on to an existing mobile-base station communication system allowing rebroadcast to a corresponding portable station has been disclosed. The system has a prioritiaztion scheme which prevents the simultaneous broadcast of two promimately located repeaters while introducing a minimum of delay time in operation.

While a preferred embodiment of the invention is disclosed, many modifications and variations thereto are possible, all of which fall within the true spirit and scope of the invention.

I claim:

1. In a two way communication network, an improved vehicular repeater adapted to operate in the vicinity of other repeaters and arranged to cooperatively assign repeating priorities thereamong, and having a receiver for receiving a broadcast signal and a transmitter for rebroadcasting said signal, the repeater comprising:

delay means for delaying rebroadcast for a predetermined programmed time period, detecting means detecting a signal broadcast by a potentially interferring station during the delay interval, means inhibiting transmitter rebroadcast in response to said detected signal, and logic means predeterminedly responsive to signals received by said receiver for producing program signals and applying said signals to the delay means for programming the time delay.

2. The repeater of claim 1 wherein the delay means comprises clock means for producing clock signals in response to said detected signal, counting means, coupled to the clock means and the detecting means, having selectable incremental counts, said counting means further adapted to increment its count output in a first polarity in response to received program signals, and in a second polarity in response to received clock signals, and means instituting rebroadcast at a predetermined count of the counting means.

3. The repeater of claim 2 wherein the inhibiting means includes means deactivating the clock in response to said detected signal occurring during the time interval.

4. The repeater of claim 2 wherein the logic means comprises means producing a program signal on repeater turn-on, gating means operable to a first state in response to the synchronous occurrence of the program signal and a detected signal, the gating means otherwise in a second state, means operating the counter to its second mode when the gate is in its first state, and means broadcasting the program signal to increment other repeaters when the gate is in its second state.

5. The repeater of claim 2 wherein the programming means comprises means activating the counter to the second mode responsive to the absence of a detected signal during the time delay.

6. A radio wave communication system comprising:

a first station means for broadcasting a signal at a first frequency;

a second station means for receiving a signal broadcast at a second frequency;

a plurality of repeating means operable to receive a signal broadcast at said first frequency and rebroadcast the same at said second frequency;

each repeating means comprising, delay means for delaying rebroadcast for a predetermined programmed time period, logic means for detecting a signal broadcast at the second frequency during the delay period including means inhibiting rebroadcast in response to said detected signal, and programming means predeterminedly responsive to said detected signals for producing program signals and applying said signals to the delay means for programming the time delay.

7. The communication system of claim 6 wherein the delay means comprises clock means producing clock signals in response to said detected signal, counter means, coupled to the clock means and the logic means, having selectable incremental counts, said counter being operable in a first mode to output a high count and operable in a second mode to output an initial count, the counter further adapted to increment its count output in a first polarity in response to received program signals, and in a second polarity in response to received clock signals, and means instituting rebroadcast at a predetermined count of the counter means.

8. The communication system of claim 7 wherein the inhibiting means includes means deactivating the clock in response to said detected signal occurring during the time interval.

9. The communication system of claim 7 wherein the programming means comprises
means producing a program signal upon repeater turn-on,
gating means operable to a first state in response to the synchronous occurrence of the program signal and said detected signal, the gating means otherwise in a second state,
means operating the counter to its first mode when the gate is in its first state, and
means broadcasting the program signal to increment other repeaters when the gate is in its second state.

10. The communication system of claim 7 wherein the programming means comprises means activating the counter to the second mode responsive to the absence of said detected signal during the time delay.

11. The communication system of claim 6 wherein the first station means includes means receiving signals broadcast at the first frequency, the second station means includes means for broadcasting at the second frequency, and
the repeater further comprises means to receive a signal broadcast at the second frequency and rebroadcast said signal at the first frequency, and means for detecting a signal broadcast at the first frequency during the delay period including means inhibiting rebroadcast in response to said detected signal.

12. The communication system of claim 11 wherein the delay means comprises
clock means producing clock signals in response to said detected signal,
counter means, coupled to the clock means and the logic means, assuming any one of a plurality of incremental counts, the counter operable in a second mode to output an initial count, the counter further adapted to increment its count output in a first polarity in response to received program signals, and in a second polarity in response to received clock signals, and
means instituting rebroadcast at a predetermined count.

13. The communication system of claim 12 wherein the inhibiting means includes means deactivating the clock in response to said detected signal occurring during the time interval.

14. The communication system of claim 12 wherein the logic means comprises
means producing a program signal on repeater turn-on,
gating means operable to a first state in response to the synchronous occurence of the program signal and said detected signal at the second frequency, the gating means otherwise in a second state,
means operating the counter to its first mode when the gate is in its first state, and
means broadcasting the program signal to increment other repeaters when the gate is in its second state.

15. The communication system of claim 12 wherein the programming means comprises means activating the counter to the second mode responsive to the absence of said detected signal during the time delay.

16. In a radio wave communication system comprising a base station and a plurality of mobile stations, each having corresponding portable stations, the base station broadcasting and receiving on a first frequency, the portable stations broadcasting and receiving on a second frequency, each mobile station receiving signals broadcast at one frequency and rebroadcasting them at the other frequency, an improved vehicular repeater apparatus for controlling mobile station rebroadcasts and being adaptable to operate in the vicinity of other repeaters comprising in combination;
delay means for delaying mobile station rebroadcasts for a programmed time period including counter means assuming any one of a plurality of incremental counts, the counter operable in a first mode to output a high count and operable in a second mode to output an initial count, the counter further adapted to increment its count output in a first polarity in response to received clock signals,
means instituting mobile station rebroadcast at a predetermined count,
detecting means for detecting a signal broadcast at the second frequency during the delay period including means inhibiting rebroadcast in response to a detected signal,
means generating clock signals in response to said detected signal, and
logic means responsive to the detecting means detect signals for predeterminedly programming the time delay including means generating program signals to increment the counter.

17. The communication system of claim 17 wherein the inhibiting means includes means deactivating the clock in response to said detected signal occurring during the time interval.

18. The communication system of claim 16 wherein the programming means comprises
means producing a program signal on repeater turn-on
gating means operable to a first state in response to the synchronous occurrence of the program signal and said detected signal, the gating means otherwise in a second state,
means operating the counter to its first mode when the gate is in its first state, and
means broadcasting the program signal to increment other repeaters when the gate is in its second state.

19. The communication system of claim 16 wherein the programming means comprises means setting the counter to the initial count responsive to the absence of said detected signal during the time delay.

20. The method of assigning a priority of rebroadcast to one of a number of repeaters relaying signals between a base station broadcasting on a first frequency and a plurality of portable stations receiving on a second frequency including the steps of:
a. programming time delay circuitry with program signals, each signal representative of a programmed time period,
b. delaying repeater rebroadcast for the programmed time period,
c. detecting a signal broadcast at the second frequency during the delay period, and
d. inhibiting rebroadcast in response to said detected signal.

21. The method of claim 20 wherein the programming time delay circuitry step further comprises the steps of:
 a. generating clock signals in response to a received signal at the repeater,
 b. applying said clock signals to a counter;
 c. activating the counter to a high count output in a first mode and an initial count output in a second mode,
 d. incrementing the counter in a first polarity in response to the clock signals,
 e. incrementing the counter in a second polarity in response to received program signals, and
 f. initiating rebroadcast at a predetermined count.

22. The method of claim 21 wherein the programming time delay circuitry step further comprises the steps of:
 a. generating said program signal on repeater turn-on,
 b. gating the program signal, in a gate, with a said detected signal broadcast at the second frequency and producing a first gate state in response to the synchronous occurrence of the two signals, otherwise producing a second gate state,
 c. activating the counter to its first mode if the gate is in its first state, otherwise
 d. broadcasting the program signal to increment other repeaters if the gate is in its second state.

23. The method of claim 22 wherein the programming step further comprises the step of:
 activating the counter to its second mode in response to the absence of a detected signal during the delay period.

24. The method of claim 21 wherein the inhibiting step further comprises the step of:
 deactivating the clock in response to said detected signal during the time delay.

25. In a radio wave communication system, having a first station and a plurality of second stations, means adapting each of said second stations to function as a repeater between said first station and a third station including means assigning a priority to each of said second stations within a given locale, said adapting means comprising first means for communicating with said third station, and second means interfacing said first means with said second station including means responsive to a signal received by said second station to initiate a delay circuitry, said delay circuitry having programmable delay increments and including means to rebroadcast said received signal through said first means at the conclusion of the delay period, detecting means detecting a signal broadcast by a potentially interfering mobile station during the delay interval, means inhibiting first means rebroadcast of the received signal in response to said detected signal, and means producing program signals for programming the time delay.

26. The communication system of claim 25 wherein the programmed delay means comprises
 means initiating a clock signal generator in response to the reception of a signal at said second station,
 counter means, coupled to the detecting means and clock signal generator, assuming any one of a plurality of incremental counts, the counter operable in a first mode to output an initial count, the counter further adapted to increment its count output in a first polarity in response to received program signals, and in a second polarity in response to received clock signals, and
 means instituting rebroadcast at a predetermined count.

27. The communication system of claim 26 wherein the inhibiting means includes means deactivating the clock in response to said detected signal occurring during the time interval.

28. The communication system of claim 26 wherein the programming means comprises
 means producing a program signal on repeater turn-on,
 gating means operable to a first state in response to the synchronous occurrence of the program signal and said detected signal, the gating means otherwise in a second state,
 means operating the counter to its first mode when the gate is in its first state, and
 means broadcasting the program signal to increment other repeaters when the gate is in its second state.

29. A method of adapting each mobile station in a radio wave communication system, having a base station and a plurality of mobile stations all operably broadcasting and receiving signals on a first frequency, for repeating received first frequency signals at a second frequency, including means assigning a priority to each potentially interfering repeater whereby only one of said repeaters is active at one time, including the steps of
 1. programming time delay circuitry with program signals,
 2. coupling said received first frequency signals to trigger said time delay circuitry,
 3. delaying repeater rebroadcast for the programmed time delay,
 4. detecting a signal broadcast at the second frequency during the delay period, and
 5. inhibiting rebroadcast in response to said detected signal.

30. The method of claim 29 wherein the programming time delay circuitry step further comprises the steps of:
 a. generating clock signals in response to said received first frequency signals at the repeater,
 b. applying said clock signals to a counter,
 c. activating the counter to a high count output in a first mode and an initial count output in a second mode,
 d. incrementing the counter in a first polarity in response to the clock signals,
 e. incrementing the counter in a second polarity in response to received program signals, and
 f. initiating rebroadcast at a predetermined count.

31. The method of claim 30 wherein the programming time delay circuitry step further comprises the steps of:
 a. generating a program signal on repeater turn-on,
 b. gating the program signal with said detected signal broadcast at the second frequency and producing a first state in response to the synchronous occurrence of the two signals, otherwise producing a second state,
 c. activating the counter to its first mode if the gate is in its first state, otherwise
 d. broadcasting the program signal to increment other repeaters if the gate is in its second state.

32. The method of claim 31 wherein the programming step further comprises the step of:
 setting the counter to the initial state in response to the absence of said detected signal during the delay period.

33. The method of claim 31 wherein the inhibiting step further comprises the step of:
 deactivating the clock in response to said detected signal during the time delay.

* * * * *